United States Patent
Wu et al.

(10) Patent No.: US 10,194,455 B2
(45) Date of Patent: Jan. 29, 2019

(54) METHOD FOR FEEDING BACK CHANNEL QUALITY INDICATOR, AND METHOD AND APPARATUS FOR SENDING RESOURCE SCHEDULING INFORMATION

(71) Applicant: Huawei Technologies Co., Ltd., Shenzhen, Guangdong (CN)

(72) Inventors: Qiang Wu, Beijing (CN); Weijun Sun, Beijing (CN); Leiming Zhang, Beijing (CN); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 158 days.

(21) Appl. No.: 15/263,165

(22) Filed: Sep. 12, 2016

(65) Prior Publication Data

US 2016/0381697 A1 Dec. 29, 2016

Related U.S. Application Data

(63) Continuation of application No. PCT/CN2014/073290, filed on Mar. 12, 2014.

(51) Int. Cl.
*H04W 72/12* (2009.01)
*H04B 7/06* (2006.01)
*H04L 1/00* (2006.01)

(52) U.S. Cl.
CPC ...... *H04W 72/1231* (2013.01); *H04B 7/0632* (2013.01); *H04L 1/0026* (2013.01); *H04B 7/0626* (2013.01)

(58) Field of Classification Search
CPC .............................. H04W 72/1231
See application file for complete search history.

(56) References Cited

U.S. PATENT DOCUMENTS

2009/0316676 A1* 12/2009 Kolding ............... H04L 1/0026
370/345
2012/0076028 A1* 3/2012 Ko ........................ H04L 1/0026
370/252

(Continued)

FOREIGN PATENT DOCUMENTS

CN 101552649 A 10/2009
CN 101754463 A 6/2010

(Continued)

OTHER PUBLICATIONS

Marzetta, T., "Noncooperative Cellular Wireless with Unlimited Numbers of Base Station Antennas", IEEE Transactions on Wireless Communications, vol. 9, No. 11, Nov. 2010, pp. 3590-3600.
"3rd Generation Partnership Project; Technical Specification Group Radio Access Network; Evolved Universal Terrestrial Radio Access (E-UTRA); Multiplexing and channel coding (Release 12)", 3GPP TS 36.212 V12.0.0, Dec. 2013, 88 pages.

(Continued)

*Primary Examiner* — Andrew Lai
*Assistant Examiner* — Andrew C Lee

(57) ABSTRACT

Embodiments of the present invention provide a method for feeding back a channel quality indicator, and a method and an apparatus for sending resource scheduling information. An apparatus for feeding back a channel quality indicator includes: a determining module, configured to determine a feedback granularity of a CQI according to a system bandwidth, a CQI feedback mode, and antenna port quantity information specified by a network device; and a feedback module, configured to feed back the CQI to the network device according to the feedback granularity of the CQI. The method for feeding back a channel quality indicator, and the method and the apparatus for sending resource scheduling information provided in the embodiments of the present invention are used to reduce system overheads.

16 Claims, 7 Drawing Sheets

(56) References Cited

U.S. PATENT DOCUMENTS

| | | | |
|---|---|---|---|
| 2012/0106661 A1 | 5/2012 | Jiang et al. | |
| 2012/0320862 A1* | 12/2012 | Ko | H04B 7/0417 370/329 |
| 2013/0058295 A1* | 3/2013 | Ko | H04B 7/063 370/329 |
| 2013/0182789 A1* | 7/2013 | Ko | H04B 7/0626 375/267 |
| 2013/0322376 A1* | 12/2013 | Marinier | H04W 72/06 370/329 |
| 2013/0343299 A1 | 12/2013 | Sayana et al. | |
| 2014/0045510 A1* | 2/2014 | Yue | H04W 72/042 455/450 |
| 2014/0119325 A1* | 5/2014 | Xia | H04L 1/0027 370/329 |
| 2016/0021655 A1* | 1/2016 | Seo | H04L 1/1829 370/280 |

FOREIGN PATENT DOCUMENTS

| | | |
|---|---|---|
| CN | 102223719 A | 10/2011 |
| CN | 102468923 A | 5/2012 |
| CN | 102468924 A | 5/2012 |
| CN | 103391126 A | 11/2013 |
| CN | 103560816 A | 2/2014 |
| WO | 2013004198 A1 | 1/2013 |
| WO | 2013023290 A1 | 2/2013 |

OTHER PUBLICATIONS

"3rd Generation Partnership Project; Technical Specification Group Radio Access Network; Evolved Universal Terrestrial Radio Access (E-UTRA); Physical layer procedures (Release 12)", 3GPP TS 36.213 v12.0.0, Dec. 2013, 186 pages.

* cited by examiner

METHOD FOR FEEDING BACK CHANNEL QUALITY INDICATOR, AND METHOD AND APPARATUS FOR SENDING RESOURCE SCHEDULING INFORMATION

CROSS-REFERENCE TO RELATED APPLICATION

This application is a continuation of International Application No. PCT/CN2014/073290, filed on Mar. 12, 2014, the disclosure of which is hereby incorporated by reference in its entirety.

TECHNICAL FIELD

Embodiments of the present invention relate to the field of communications technologies, and in particular, to a method for feeding back a channel quality indicator, and a method and an apparatus for sending resource scheduling information.

BACKGROUND

A multiple-input multiple-output (Multiple-Input Multiple-Output, MIMO) antenna technology is a key technology in wireless communications. A MIMO wireless system can obtain a diversity and an array gain by transmission beamforming (Beamforming, BF)/precoding and receive signal combination. Transmission beamforming or precoding needs to use a precoding matrix. To obtain an optimal precoding matrix, a transmit end needs to completely know channel state info/nation (Channel State Information, CSI). Therefore, a receive end needs to perform quantization on instantaneous CSI and provide feedback to the transmit end. This kind of MIMO system is referred to as a closed-loop MIMO system.

For the closed-loop MIMO system, the CSI fed back by the receive end to the transmit end includes information such as a channel quality indicator (Channel Quality Indicator, CQI), a precoding matrix indicator (Precoding Matrix Indicator, PMI), and a rank indicator (Rank Indicator, RI). When the receive end feeds back the CQI on a physical uplink control channel (Physical Uplink Control Channel, PUCCH) or a physical uplink shared channel (Physical Uplink Shared Channel, PUSCH), there are various types of feedback modes. For one type of feedback mode, for a given system bandwidth, a feedback granularity of a CQI of a subband is constant.

However, when the MIMO system has a relatively large quantity of antenna ports, for example, massive MIMO (Massive MIMO), a larger quantity of antennas indicates smaller frequency selectivity of channel quality after precoding. When the quantity of the antennas is very large, a frequency of the channel quality shows a feature close to flatness. However, an existing manner of feeding back a CQI at a constant feedback granularity does not use the foregoing feature, thereby increasing system overheads.

SUMMARY

Embodiments of the present invention provide a method for feeding back a channel quality indicator, and a method and an apparatus for sending resource scheduling information, to reduce system overheads.

A first aspect provides an apparatus for feeding back a channel quality indicator, including:

a determining module, configured to determine a feedback granularity of a CQI according to a system bandwidth, a CQI feedback mode, and antenna port quantity information specified by a network device; and a feedback module, configured to feed back the CQI to the network device according to the feedback granularity of the CQI.

In a first possible implementation manner of the first aspect, the apparatus for feeding back a channel quality indicator further includes:

an obtaining module, configured to obtain the system bandwidth, the CQI feedback mode, and the antenna port quantity information specified by the network device that are sent by the network device.

With reference to the first aspect or the first possible implementation manner of the first aspect, in a second possible implementation manner, the antenna port quantity information specified by the network device includes CSI-RS antenna port quantity information specified by the network device.

With reference to the first aspect or either of the first and the second possible implementation manners of the first aspect, in a third possible implementation manner, in a same system bandwidth and a same CQI feedback mode, if the network device includes at least two types of antenna port quantities and each type of antenna port quantity corresponds to a different feedback granularity, a larger antenna port quantity indicates a larger feedback granularity.

With reference to the first aspect or any one of the first to the third possible implementation manners of the first aspect, in a fourth possible implementation manner, the feedback granularity of the CQI includes a size of a frequency width corresponding to the CQI.

A second aspect provides an apparatus for receiving a channel quality indicator, including:

a receiving module, configured to receive a CQI fed back by UE, where a feedback granularity of the CQI is determined by the UE according to a system bandwidth, a CQI feedback mode, and antenna port quantity information specified by a network device.

In a first possible implementation manner of the second aspect, the apparatus for receiving a channel quality indicator further includes:

a sending module, configured to send the system bandwidth, the CQI feedback mode, and the antenna port quantity information specified by the network device to the UE.

With reference to the second aspect or the first possible implementation manner of the second aspect, in a second possible implementation manner, the antenna port quantity information specified by the network device includes CSI-RS antenna port quantity information specified by the network device.

With reference to the second aspect or either of the first and the second possible implementation manners of the second aspect, in a third possible implementation manner, in a same system bandwidth and a same CQI feedback mode, if the network device includes at least two types of antenna port quantities and each type of antenna port quantity corresponds to a different feedback granularity, a larger antenna port quantity indicates a larger feedback granularity.

With reference to the second aspect or any one of the first to the third possible implementation manners of the second aspect, in a fourth possible implementation manner, the feedback granularity of the CQI includes a size of a corresponding frequency width.

A third aspect provides an apparatus for sending resource scheduling information, including:

a determining module, configured to determine a resource scheduling manner according to antenna port quantity information specified by a network device; and a sending module, configured to send resource scheduling information to UE according to the resource scheduling manner.

In a first possible implementation manner of the third aspect, the sending module is further configured to send the antenna port quantity information specified by the network device to the UE.

With reference to the third aspect or the first possible implementation manner of the third aspect, in a second possible implementation manner, the resource scheduling manner includes a contiguous resource scheduling manner and a non-contiguous resource scheduling manner; and the determining module is specifically configured to: if it is determined that an antenna port quantity specified by the network device is greater than a preset threshold, determine to use the contiguous resource scheduling manner; otherwise, determine to use the non-contiguous resource scheduling manner.

With reference to the second possible implementation manner of the third aspect, in a third possible implementation manner, a bit quantity used in the contiguous resource scheduling manner is $\lceil \log_2(N_{RB}^{DL}(N_{RB}^{DL}+1)/2) \rceil$, and a bit quantity used in the non-contiguous resource scheduling manner is $\lceil N_{RB}^{DL}/P \rceil$, where $N_{RB}^{DL}$ represents a downlink system bandwidth, and P is determined according to the downlink system bandwidth and a subband size and is an integer.

With reference to the second or the third possible implementation manner of the third aspect, in a fourth possible implementation manner, the apparatus for sending resource scheduling information further includes:

a generation module, configured to: if the determining module determines to use the contiguous resource scheduling manner, generate extended multi-user MIMO pairing information; where the sending module is further configured to send the extended multi-user MIMO pairing information to the UE.

With reference to the third aspect or any one of the first to the fourth possible implementation manners of the third aspect, in a fifth possible implementation manner, the determining module is specifically configured to determine the resource scheduling manner according to set measurement CSI antenna port quantity information.

A fourth aspect provides an apparatus for receiving resource scheduling information, including:

a determining module, configured to determine a resource scheduling manner according to antenna port quantity information specified by a network device; and a receiving module, configured to receive, according to the resource scheduling manner, resource scheduling information sent by the network device.

In a first possible implementation manner of the fourth aspect, the apparatus for receiving resource scheduling information further includes:

an obtaining module, configured to obtain the antenna port quantity information that is sent by the network device and that is specified by the network device.

With reference to the fourth aspect or the first possible implementation manner of the fourth aspect, in a second possible implementation manner, the resource scheduling manner includes a contiguous resource scheduling manner and a non-contiguous resource scheduling manner; and the determining module is specifically configured to: if it is determined that an antenna port quantity specified by the network device is greater than a preset threshold, determine to use the contiguous resource scheduling manner; otherwise, determine to use the non-contiguous resource scheduling manner.

With reference to the second possible implementation manner of the fourth aspect, in a third possible implementation manner, a bit quantity used in the contiguous resource scheduling manner is $\lceil \log_2(N_{RB}^{DL}(N_{RB}^{DL}+1)/2) \rceil$, and a bit quantity used in the non-contiguous resource scheduling manner is $\lceil N_{RB}^{DL}/P \rceil$, where $N_{RB}^{DL}$ represents a downlink system bandwidth, and P is determined according to the downlink system bandwidth and a subband size and is an integer.

With reference to the second or the third possible implementation manner of the fourth aspect, in a fourth possible implementation manner, if the determining module determines to use the contiguous resource scheduling manner, the receiving module is further configured to receive extended multi-user MIMO pairing information sent by the network device.

With reference to the fourth aspect or any one of the first to the fourth possible implementation manners of the fourth aspect, in a fifth possible implementation manner, the determining module is specifically configured to determine the resource scheduling manner according to measurement CSI antenna port quantity information that is specified by the network device.

A fifth aspect provides a method for feeding back a channel quality indicator, including:

determining, by UE, a feedback granularity of a CQI according to a system bandwidth, a CQI feedback mode, and antenna port quantity information specified by a network device; and feeding back, by the UE, the CQI to the network device according to the feedback granularity of the CQI.

In a first possible implementation manner of the fifth aspect, before the determining, by UE, a feedback granularity of a CQI according to a system bandwidth, a CQI feedback mode, and antenna port quantity information specified by a network device, the method further includes:

obtaining, by the UE, the system bandwidth, the CQI feedback mode, and the antenna port quantity information specified by the network device that are sent by the network device.

With reference to the fifth aspect or the first possible implementation manner of the fifth aspect, in a second possible implementation manner, the antenna port quantity information specified by the network device includes CSI-RS antenna port quantity information specified by the network device.

With reference to the fifth aspect or either of the first and the second possible implementation manners of the fifth aspect, in a third possible implementation manner, in a same system bandwidth and a same CQI feedback mode, if the network device includes at least two types of antenna port quantities and each type of antenna port quantity corresponds to a different feedback granularity, a larger antenna port quantity indicates a larger feedback granularity.

With reference to the fifth aspect or any one of the first to the third possible implementation manners of the fifth aspect, in a fourth possible implementation manner, the feedback granularity of the CQI includes a size of a frequency width corresponding to the CQI.

A sixth aspect provides a method for receiving a channel quality indicator, including:

receiving, by a network device, a CQI fed back by UE, where a feedback granularity of the CQI is determined by the UE according to a system bandwidth, a CQI feedback mode, and antenna port quantity information specified by the network device.

In a first possible implementation manner of the sixth aspect, before the receiving, by a network device, a CQI fed back by UE, the method further includes:

sending, by the network device, the system bandwidth, the CQI feedback mode, and the antenna port quantity information specified by the network device to the UE.

With reference to the sixth aspect or the first possible implementation manner of the sixth aspect, in a second possible implementation manner, the antenna port quantity information specified by the network device includes CSI-RS antenna port quantity information specified by the network device.

With reference to the sixth aspect or either of the first and the second possible implementation manners of the sixth aspect, in a third possible implementation manner, in a same system bandwidth and a same CQI feedback mode, if the network device includes at least two types of antenna port quantities and each type of antenna port quantity corresponds to a different feedback granularity, a larger antenna port quantity indicates a larger feedback granularity.

With reference to the sixth aspect or any one of the first to the third possible implementation manners of the sixth aspect, in a fourth possible implementation manner, the feedback granularity of the CQI includes a size of a corresponding frequency width.

A seventh aspect provides a method for sending resource scheduling information, including:

determining, by a network device, a resource scheduling manner according to specified antenna port quantity information; and sending, by the network device, resource scheduling information to UE according to the resource scheduling manner.

In a first possible implementation manner of the seventh aspect, before the determining, by a network device, a resource scheduling manner according to specified antenna port quantity information, the method further includes:

sending, by the network device, the antenna port quantity information specified by the network device to the UE.

With reference to the seventh aspect or the first possible implementation manner of the seventh aspect, in a second possible implementation manner, the resource scheduling manner includes a contiguous resource scheduling manner and a non-contiguous resource scheduling manner; and the determining, by a network device, a resource scheduling manner according to specified antenna port quantity information includes:

if the network device determines that a specified antenna port quantity is greater than a preset threshold, determining to use the contiguous resource scheduling manner;

otherwise, determining, by the network device, to use the non-contiguous resource scheduling manner.

With reference to the second possible implementation manner of the seventh aspect, in a third possible implementation manner, a bit quantity used in the contiguous resource scheduling manner is $\lceil \log_2(N_{RB}^{DL}(N_{RB}^{DL}+1)2) \rceil$, and a bit quantity used in the non-contiguous resource scheduling manner is $\lceil N_{RB}^{DL}/P \rceil$, where $N_{RB}^{DL}$ represents a downlink system bandwidth, and P is determined according to the downlink system bandwidth and a subband size and is an integer.

With reference to the second or the third possible implementation manner of the seventh aspect, in a fourth possible implementation manner, if the network device determines to use the contiguous resource scheduling manner, the method further includes:

generating, by the network device, extended multi-user MIMO pairing information; and sending, by the network device, the extended multi-user MIMO pairing information to the UE.

With reference to the seventh aspect or any one of the first to the fourth possible implementation manners of the seventh aspect, in a fifth possible implementation manner, the determining, by a network device, a resource scheduling manner according to specified antenna port quantity information includes:

determining, by the network device, the resource scheduling manner according to set measurement CSI antenna port quantity information.

An eighth aspect provides a method for receiving resource scheduling information, including:

determining, by UE, a resource scheduling manner according to antenna port quantity information specified by a network device; and receiving, by the UE according to the resource scheduling manner, resource scheduling information sent by the network device.

In a first possible implementation manner of the eighth aspect, before the determining, by UE, a resource scheduling manner according to antenna port quantity information specified by a network device, the method further includes:

obtaining, by the UE, the antenna port quantity information that is sent by the network device and that is specified by the network device.

With reference to the eighth aspect or the first possible implementation manner of the eighth aspect, in a second possible implementation manner, the resource scheduling manner includes a contiguous resource scheduling manner and a non-contiguous resource scheduling manner; and the determining, by UE, a resource scheduling manner according to antenna port quantity information specified by a network device includes:

if the UE determines that an antenna port quantity specified by the network device is greater than a preset threshold, determining to use the contiguous resource scheduling manner;

otherwise, determining, by the UE, to use the non-contiguous resource scheduling manner.

With reference to the second possible implementation manner of the eighth aspect, in a third possible implementation manner, a bit quantity used in the contiguous resource scheduling manner is $\lceil \log_2(N_{RB}^{DL}(N_{RB}^{DL}+1)/2) \rceil$, and a bit quantity used in the non-contiguous resource scheduling manner is $\lceil N_{RB}^{DL}/P \rceil$, where $N_{RB}^{DL}$ represents a downlink system bandwidth, and P is determined according to the downlink system bandwidth and a subband size and is an integer.

With reference to the second or the third possible implementation manner of the eighth aspect, in a fourth possible implementation manner, if the UE determines to use the contiguous resource scheduling manner, the method further includes:

receiving, by the UE, extended multi-user MIMO pairing information sent by the network device.

With reference to the eighth aspect or any one of the first to the fourth possible implementation manners of the eighth aspect, in a fifth possible implementation manner, the determining, by UE, a resource scheduling manner according to antenna port quantity information specified by a network device includes:

determining, by the UE, the resource scheduling manner according to measurement CSI and the antenna port quantity information that are specified by the network device.

According to the method for feeding back a channel quality indicator, and the method and the apparatus for sending resource scheduling information that are provided in the embodiments, a feedback granularity of a CQI is determined according to a system bandwidth, a CQI feedback mode, and antenna port quantity information specified by a network device, and the CQI is fed back to the network device by using the determined feedback granularity of the CQI, so that the feedback granularity of the CQI is related to an antenna port quantity specified by the network device. Therefore, in a case in which the antenna port quantity specified by the network device increases, a bit quantity needed to feed back the CQI may be reduced, thereby reducing system overheads.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

Figure 1:
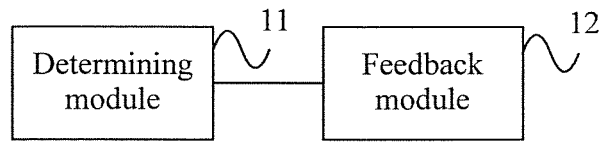
FIG. 1 is a schematic structural diagram of Embodiment 1 of an apparatus for feeding back a channel quality indicator according to an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

A typical MIMO system in which BF or precoding is used may usually be represented as: y=HVs+n, where y represents a received signal vector, H represents a channel matrix, V represents a precoding matrix, s represents a transmitted symbol vector, and n represents measurement noise. It can be learned from the foregoing formula that, if a transmit end needs to implement optimal transmission, an optimal precoding matrix needs to be obtained. Usually, optimal precoding can be obtained only when the transmit end completely already knows a CSI.

In a current closed-loop MIMO system, a commonly used CSI feedback method is that user equipment (User Equipment, UE) quantifies an instant CSI and provides feedback to a node B (NodeB). The NodeB herein includes a base station (Base Station, BS) of any form. The CSI that needs to be fed back to the NodeB by the UE includes information such as an RI, a PMI, and a CQI, where the RI and the PMI respectively indicate a used layer quantity and a used precoding matrix. When the RI≥2, when sending data, the NodeB performs sending by using codewords (Codeword) of two channel codes. Similarly, when feeding back the CQI when the RI≥2, the UE needs to feed back CQIs of two codewords. When the UE feeds back, on a PUCCH or a PUSCH, a CQI, there are various feedback modes, for example, a PUCCH feedback mode 1-1 and a PUCCH feedback mode 2-1.

For one type of feedback mode, for a given system bandwidth, a feedback granularity of a CQI of a subband is constant. The feedback granularity of the CQI represents a size of the subband represented by the CQI that is fed back. For example, in the PUCCH feedback mode 2-1, the feedback granularity of the CQI of the subband is shown in Table 1.

TABLE 1

Relationship between a downlink system bandwidth and a subband size in a PUSCH feedback mode 3-1

| Downlink system bandwidth | Subband size |
|---|---|
| 6-7 | N/A |
| 8-10 | 4 |
| 11-26 | 4 |
| 27-63 | 6 |
| 64-110 | 8 |

In Table 1, the downlink system bandwidth and the subband size are both in units of resource block (Resource Block, RB). When the system bandwidth and the subband size are not in an exact division relationship, a size of the last subband is $$N_{dl} - \left\lfloor \frac{N_{dl}}{K} \right\rfloor * K,$$

where $N_{dl}$ is a downlink system bandwidth, K is the subband size fed back by the CQI, $$\left\lfloor \frac{N_{dl}}{K} \right\rfloor$$

represents rounding $$\frac{N_{dl}}{K}$$

down to the nearest integer, and N/A represents not applicable (Not Applicable), that is, the subband is not divided.

To improve performance of a wireless communications system, an antenna port quantity becomes larger. For example, in the case of Massive MIMO, a feature of a channel changes. When the antenna port quantity increases, a codebook that needs to be represented increases. Frequency selectivity of channel quality is smaller after precoding. When an antenna quantity is relatively large, a frequency of the channel quality shows a feature close to flatness, and CQIs of same bits represent basically consistent performance in the case of relatively many subbands. However, in an existing CQI feedback mode, a subband size represented by a CQI that is fed back is constant relative to a system bandwidth. Therefore, in a case in which the antenna port quantity is relatively large, a bit quantity fed back by a subband CQI does not use the foregoing features of an antenna port and channel quality, thereby increasing system overheads.

An embodiment of the present invention provides a method and an apparatus for feeding back a channel quality indicator, applied to a MIMO wireless communications system. A feedback granularity of a CQI is determined according to an antenna port quantity of the MIMO system, thereby reducing a bit quantity needed to feed back the CQI.

FIG. 1 is a schematic structural diagram of Embodiment 1 of an apparatus for feeding back a channel quality indicator according to an embodiment of the present invention. As shown in FIG. 1, the apparatus for feeding back a channel quality indicator in this embodiment includes: a determining module 11 and a feedback module 12.

The determining module 11 is configured to determine a feedback granularity of a CQI according to a system bandwidth, a CQI feedback mode, and antenna port quantity information specified by a network device.

Specifically, the apparatus for feeding back a channel quality indicator provided in this embodiment is located on a UE side, or may be disposed in UE. The apparatus for feeding back a channel quality indicator provided in this embodiment is configured to feed back the CQI to the network device in a network, where the network device is an access device in the network, for example, a base station or an evolved node B (Evolved Node B, eNodeB) of any type.

In an existing CQI feedback method, the determining module 11 determines the feedback granularity of the CQI according to the system bandwidth and the CQI feedback mode, where the feedback granularity of the CQI represents a size of content of information fed back by the CQI. For example, the feedback granularity of the CQI includes a subband size represented by a CQI fed back by UE, that is, a size of a frequency width corresponding to the CQI. In a different CQI feedback mode, the subband size of the CQI corresponding to the corresponding system bandwidth is definite. Therefore, a feedback granularity of the UE is also definite. In this embodiment, based on the system bandwidth and the CQI feedback mode, the determining module 11 further determines the feedback granularity of the CQI according to the antenna port quantity information that is specified by the network device accessed by the UE. For example, as shown in Table 2 and Table 3, when the antenna port quantity that is specified by the network device accessed by the UE is less than $N_1$, a relationship between the downlink system bandwidth and the subband size of the CQI is shown in Table 2. When the antenna port quantity that is specified by the network device accessed by the UE is greater than or equal to $N_1$, the relationship between the downlink system bandwidth and the subband size of the CQI is shown in Table 3. It should be noted that in correspondences shown in Table 2 and Table 3, feedback modes of the CQI are the same.

TABLE 2

Relationship between a downlink system bandwidth and a subband size of a CQI when an antenna port quantity is less than $N_1$

| Downlink system bandwidth | Subband size |
|---|---|
| 6-7 | N/A |
| 8-10 | 4 |
| 11-26 | 4 |

TABLE 2-continued

Relationship between a downlink system bandwidth and a subband size of a CQI when an antenna port quantity is less than $N_1$

| Downlink system bandwidth | Subband size |
|---|---|
| 27-63 | 6 |
| 64-110 | 8 |

TABLE 3

Relationship between a downlink system bandwidth and a subband size of a CQI when an antenna port quantity is greater than or equal to $N_1$

| Downlink system bandwidth | Subband size |
|---|---|
| 6-7 | N/A |
| 8-10 | 6 |
| 11-26 | 6 |
| 27-63 | 9 |
| 64-110 | 12 |

In Table 2 and Table 3, the downlink system bandwidth and the subband size of the CQI are both in units of RB. It can be seen from Table 2 and Table 3 that, in a definite CQI feedback mode, in the case of a same downlink system bandwidth, the antenna port quantity specified by the network device is relatively large, and correspondingly, the subband size of the CQI is also relatively large. On the basis that the downlink system bandwidth and the CQI feedback mode are determined, according to the foregoing settings, the determining module 11 may determine different subband sizes of the CQI according to the antenna port quantity information specified by the network device. A larger antenna port quantity indicates a larger subband size of the CQI. The subband size of the CQI is the feedback granularity of the CQI determined by the UE.

Further, cases shown in Table 2 and Table 3 show only two cases: the antenna port quantity is less than $N_1$ and the antenna port quantity is greater than or equal to $N_1$. The apparatus for feeding back a channel quality indicator provided in this embodiment is not limited thereto. Alternatively, the antenna port quantity may be divided into more than two range intervals, for example, three cases: the antenna port quantity is less than $N_1$, is greater than or equal to $N_1$ and less than $N_2$, and is greater than or equal to $N_2$. When the antenna port quantity falls within different range intervals, the antenna port quantity corresponds to different feedback granularities of the CQI in a same CQI feedback mode and a same system bandwidth. In conclusion, in a same system bandwidth and a same CQI feedback mode, if the network device includes at least two types of antenna port quantities and each type of antenna port quantity corresponds to a different feedback granularity, a larger antenna port quantity indicates a larger feedback granularity.

The feedback module 12 is configured to feed back the CQI to the network device according to the feedback granularity of the CQI.

Specifically, after the determining module 11 determines the feedback granularity of the CQI, the feedback module 12 feeds back, according to the feedback granularity, the CQI to the network device accessed by the UE. The feedback granularity of the CQI determined by the determining module 11 is not only determined according to the CQI feedback mode and the system bandwidth, but also determined according to the antenna port quantity information specified by the network device. Therefore, the feedback granularity of the CQI fully takes a characteristic of the MIMO system into consideration. When the antenna port quantity of the MIMO system is relatively large, for example, a massive antenna port quantity in Massive MIMO, when the antenna port quantity increases, a subband size fed back by the CQI is increased, that is, the feedback granularity of the CQI is increased, thereby reducing a bit quantity used by the UE to feed back the CQI, and saving system overheads.

In addition, the bit quantity that is used to feed back the CQI and that is reduced by using this embodiment may further be used to send or feed back another piece of information, so that the existing MIMO system feeds back richer channel reference signal information without increasing extra overheads.

In this embodiment, a feedback granularity of a CQI is determined according to a system bandwidth, a CQI feedback mode, and antenna port quantity information specified by a network device, and the CQI is fed back to the network device by using the determined feedback granularity of the CQI, so that the feedback granularity of the CQI is related to an antenna port quantity specified by the network device. Therefore, in a case in which the antenna port quantity specified by the network device increases, a bit quantity needed to feed back the CQI may be reduced, thereby reducing system overheads.

Figure 2:
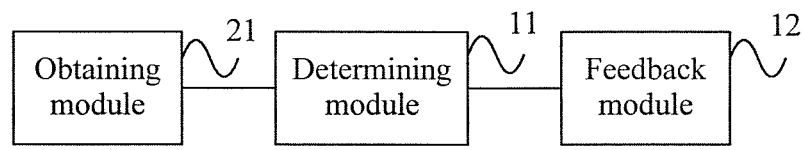
FIG. 2 is a schematic structural diagram of Embodiment 2 of an apparatus for feeding back a channel quality indicator according to an embodiment of the present invention.

FIG. 2 is a schematic structural diagram of Embodiment 2 of an apparatus for feeding back a channel quality indicator according to an embodiment of the present invention. As shown in FIG. 2, on the basis of FIG. 1, the apparatus for feeding back a channel quality indicator in this embodiment further includes:

an obtaining module 21, configured to obtain the system bandwidth, the CQI feedback mode, and the antenna port quantity information specified by the network device that are sent by the network device.

Specifically, the apparatus for feeding back a channel quality indicator provided in this embodiment further includes the obtaining module 21, where the obtaining module 21 is configured to obtain a system bandwidth, a CQI feedback mode, and the antenna port quantity information specified by the network device. The system bandwidth, the CQI feedback mode, and the antenna port quantity information specified by the network device are all set on a network device side. Therefore, the obtaining module 21 obtains the system bandwidth, the CQI feedback mode, and the antenna port quantity information specified by the network device that are sent by the network device. The obtaining module 21 may obtain the foregoing information directly sent by the network device. In addition, the obtaining module 21 may indirectly obtain the foregoing information from various signaling or information sent by the network device.

In the embodiments shown in FIG. 1 and FIG. 2, the antenna port quantity information specified by the network device may be any type of antenna port quantity information actively or passively specified by the network device, provided that the antenna port quantity information can be obtained by the obtaining module 21. For example, the antenna port quantity information specified by the network device includes: channel state information-reference signal (Channel State Information-Reference Signal, CSI-RS) antenna port quantity information that is specified by the network device.

Figure 3:
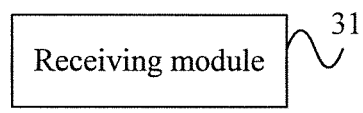
FIG. 3 is a schematic structural diagram of Embodiment 1 of an apparatus for receiving a channel quality indicator according to an embodiment of the present invention.

FIG. 3 is a schematic structural diagram of Embodiment 1 of an apparatus for receiving a channel quality indicator according to an embodiment of the present invention. As shown in FIG. 3, the apparatus for receiving a channel quality indicator in this embodiment includes:

a receiving module 31, configured to receive a CQI fed back by UE, where a feedback granularity of the CQI is determined by the UE according to a system bandwidth, a CQI feedback mode, and antenna port quantity information specified by a network device.

Specifically, the apparatus for receiving a channel quality indicator provided in this embodiment is located on a network device side, or may be disposed in the network device. The apparatus for receiving a channel quality indicator provided in this embodiment is configured to receive the CQI fed back by the UE, where the network device is an access device in a network, for example, a base station or an eNodeB of any type.

In an existing CQI feedback method, the UE determines the feedback granularity of the CQI according to the system bandwidth and the CQI feedback mode, where the feedback granularity of the CQI represents a size of content of information fed back by the CQI. For example, the feedback granularity of the CQI includes a subband size represented by the CQI fed back by the UE, that is, a size of a frequency width corresponding to the CQI. In a different CQI feedback mode, the subband size of the CQI corresponding to the corresponding system bandwidth is definite. Therefore, a feedback granularity of the UE is also definite. In this embodiment, the receiving module 31 receives the CQI fed back by the UE, where the feedback granularity of the CQI is determined by the UE according to the system bandwidth, the CQI feedback mode, and the antenna port quantity information specified by the network device. That is, the feedback granularity of the CQI that is received by the receiving module 31 and that is fed back by the UE is further determined, on the basis of the system bandwidth and the CQI feedback mode, by the UE according to the antenna port quantity information specified by the network device. Feedback granularities of the CQI corresponding to different antenna port quantities specified by the network device are shown in Table 2 and Table 3. It can be seen from Table 2 and Table 3 that, in a definite CQI feedback mode, in the case of a same downlink system bandwidth, the antenna port quantity specified by the network device is relatively large, and correspondingly, the subband size of the CQI is also relatively large, that is, the feedback granularity of the CQI is relatively large.

Further, cases shown in Table 2 and Table 3 show only two cases: the antenna port quantity is less than $N_1$ and the antenna port quantity is greater than or equal to $N_1$. The apparatus for receiving a channel quality indicator provided in this embodiment is not limited thereto. Alternatively, the antenna port quantity may be divided into more than two range intervals, for example, three cases: the antenna port quantity is less than $N_1$, is greater than or equal to $N_1$ and less than $N_2$, and is greater than or equal to $N_2$. When the antenna port quantity falls within different range intervals, the antenna port quantity corresponds to different feedback granularities of the CQI in a same CQI feedback mode and a same system bandwidth. In conclusion, in a same system bandwidth and a same CQI feedback mode, if the network device includes at least two types of antenna port quantities and each type of antenna port quantity corresponds to a different feedback granularity, a larger antenna port quantity indicates a larger feedback granularity.

The feedback granularity of the CQI received by the receiving module 31 is not only determined according to the CQI feedback mode and the system bandwidth, but also determined according to the antenna port quantity information specified by the network device. Therefore, the feedback granularity of the CQI fully takes a characteristic of the MIMO system into consideration. When the antenna port quantity of the MIMO system is relatively large, for example, a massive antenna port quantity in Massive MIMO, when the antenna port quantity increases, a subband size fed back by the CQI is increased, that is, the feedback granularity of the CQI is increased, thereby reducing a bit quantity used by the UE to feed back the CQI, and saving system overheads.

In addition, the bit quantity that is used to feed back the CQI and that is reduced by using this embodiment may further be used to send or feed back another piece of information, so that the existing MIMO system feeds back richer channel reference signal information without increasing extra overheads.

In this embodiment, a feedback granularity of a CQI is determined according to a system bandwidth, a CQI feedback mode, and antenna port quantity information specified by a network device, and the CQI is fed back to the network device by using the determined feedback granularity of the CQI, so that the feedback granularity of the CQI is related to an antenna port quantity specified by the network device. Therefore, in a case in which the antenna port quantity specified by the network device increases, a bit quantity needed to feed back the CQI may be reduced, thereby reducing system overheads.

Figure 4:
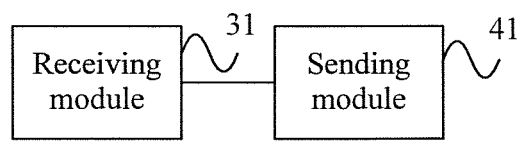
FIG. 4 is a schematic structural diagram of Embodiment 2 of an apparatus for receiving a channel quality indicator according to an embodiment of the present invention.

FIG. 4 is a schematic structural diagram of Embodiment 2 of an apparatus for receiving a channel quality indicator according to an embodiment of the present invention. As shown in FIG. 4, on the basis of FIG. 3, the apparatus for receiving a channel quality indicator in this embodiment further includes:

a sending module 41, configured to send the system bandwidth, the CQI feedback mode, and the antenna port quantity information specified by the network device to the UE.

Specifically, the apparatus for receiving a channel quality indicator provided in this embodiment further includes the sending module 41, where the sending module 41 is configured to send the system bandwidth, the CQI feedback mode, and the antenna port quantity information specified by the network device to the UE. The system bandwidth, the CQI feedback mode, and the antenna port quantity information specified by the network device are all set on a network device side. Therefore, the sending module 41 needs to send the foregoing info/nation to the UE, so that the UE can determine a feedback granularity of a CQI according to the foregoing information and feed back a corresponding CQI to the network device. The sending module 41 may directly send the foregoing information to the network device. In addition, the sending module 41 may indirectly send the foregoing information to the UE by using various signaling or information.

In the embodiments shown in FIG. 3 and FIG. 4, the antenna port quantity information specified by the network device may be any type of antenna port quantity information actively or passively specified by the network device, provided that the antenna port quantity information can be sent by the sending module 41 to the UE. For example, the antenna port quantity information specified by the network device includes CSI-RS antenna port quantity information specified by the network device.

The embodiments shown in FIG. 1 to FIG. 4 show that when feeding back the CQI to the network device, the UE may adjust the feedback granularity of the CQI by using the antenna port quantity information specified by the network device, to resolve the bit quantity used by the UE to feed back the CQI. However, on the network device side, the network device needs to send various information including a carrier indicator, resource scheduling, power control, a transmission mode, and the like to the UE, and the various information needs to occupy specific bits. The bits used by the foregoing various information occupy a very large part of system overheads.

For downlink resource scheduling in a closed-loop MIMO system, for example, a MIMO mode TM9 demodulated based on a demodulation reference signal (Demodulation Reference Signal, DMRS), a resource allocation manner of a type 0 (Type 0) or a type 1 (Type 1) is used to indicate allocation of an RB, where the type 0 uses a resource allocation manner of a resource block group (Resource Block Group, RBG), and the type 1 uses a resource allocation manner of a bitmap (Bitmap). Resource allocation manners of the type 0 and the type 1 are performing allocation and scheduling on an RB resource in a discrete manner, and therefore may be referred to as a non-contiguous resource scheduling method. However, in uplink transmission of Long Term Evolution (Long Term Evolution, LTE), there is a contiguous resource scheduling manner. A main objective of using the contiguous resource scheduling manner in the uplink transmission is to reduce a peak-to-average power ratio. Compared with a non-contiguous resource scheduling manner, the contiguous resource scheduling manner may reduce a bit quantity of control signaling.

However, it is found through research that when the antenna port of the MIMO system is greater than a specific quantity, frequency selectivity of each channel tends to be stable. In this case, if downlink resource scheduling is performed in the contiguous resource scheduling manner, performance same as that of the non-contiguous resource scheduling manner can be achieved. Therefore, the present invention provides an apparatus for sending resource scheduling information. A used resource scheduling manner is determined based on the antenna port quantity information specified by the network device, thereby saving the bit quantity of the control signaling used for the resource scheduling.

Figure 5:
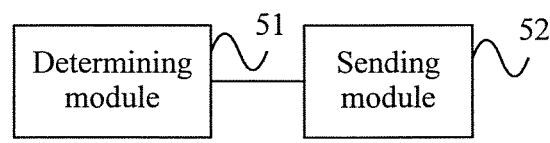
FIG. 5 is a schematic structural diagram of Embodiment 1 of an apparatus for sending resource scheduling information according to an embodiment of the present invention.

FIG. 5 is a schematic structural diagram of Embodiment 1 of an apparatus for sending resource scheduling information according to an embodiment of the present invention. As shown in FIG. 5, the apparatus for sending resource scheduling information in this embodiment includes: a determining module 51 and a sending module 52.

The determining module 51 is configured to determine a resource scheduling manner according to antenna port quantity information specified by a network device.

Specifically, the apparatus for sending resource scheduling information provided in this embodiment is located on a network device side, or may be disposed in the network device. The apparatus for sending resource scheduling information provided in this embodiment is configured to send resource scheduling information to UE, where the network device is an access device in a network, for example, a base station or an eNodeB of any type.

In an existing MIMO system, a non-contiguous resource allocation manner is used in downlink resource scheduling, that is, allocation of a downlink RB is determined in an RGB or a Bitmap manner. In this manner, a feature of a channel is taken into consideration, and a preferable resource may generally be allocated to each channel. However, when the antenna ports of the MIMO system increase, for example, in a Massive MIMO system, due to an increase in the antenna ports, independent channels increase accordingly and frequency selectivity of a channel tends to be stable. In this case, if a downlink RB resource is allocated in a contiguous resource allocation manner, channel performance is basically the same as that in the non-contiguous resource allocation manner.

However, for the non-contiguous resource allocation manner, the bit quantity used for resource scheduling is $\lceil N_{RB}^{DL}/P \rceil$, where $N_{RB}^{DL}$ represents a downlink system bandwidth, P is determined according to the downlink system bandwidth and a subband size and is an integer, and $\lceil N_{RB}^{DL}/P \rceil$ represents rounding $N_{RB}^{DL}/P$ up to the nearest integer. A relationship between a value of P and the downlink system bandwidth is shown in Table 4.

TABLE 4

Relationship between P and a downlink system bandwidth

| Downlink system bandwidth | P |
|---|---|
| ≤10 | 1 |
| 11-26 | 2 |
| 27-63 | 3 |
| 64-110 | 4 |

However, if the contiguous resource allocation manner is used, the bit quantity used for the resource scheduling is $\lceil \log_2(N_{RB}^{DL}(N_{RB}^{DL}+1)/2) \rceil$, where $N_{RB}^{DL}$ represents the downlink system bandwidth, and $\lceil \log_2(N_{RB}^{DL}(N_{RB}^{DL}+1)/2) \rceil$ represents rounding $\log_2(N_{RB}^{DL}(N_{RB}^{DL}+1)/2)$ up to the nearest integer. It can be learned by comparing the contiguous resource allocation manner with the non-contiguous resource allocation manner that, the bit quantity used for the resource scheduling in the contiguous resource allocation manner is less than the bit quantity used for the resource scheduling in the non-contiguous resource allocation manner. Table 5 shows bit quantities that need to be used for contiguous resource scheduling and non-contiguous resource scheduling in different downlink system bandwidths.

TABLE 5

Bit quantities that need to be used for contiguous resource scheduling and non-contiguous resource scheduling in different downlink system bandwidths

| Downlink system bandwidth | Contiguous resource scheduling | Non-contiguous resource scheduling |
|---|---|---|
| 6 | 5 | 6 |
| 15 | 7 | 8 |
| 25 | 9 | 13 |
| 50 | 11 | 17 |
| 75 | 12 | 19 |
| 100 | 13 | 25 |

In Table 4 and Table 5, the downlink system bandwidth is in units of RB, the columns of contiguous resource scheduling and non-contiguous resource scheduling show the bit quantities that need to be used. It can be seen from Table 5 that, when the downlink system bandwidth is larger, the contiguous resource scheduling reduces more bit quantities than the non-contiguous resource scheduling.

Therefore, the apparatus for sending resource scheduling information provided in this embodiment includes the determining module 51, where the determining module 51 is configured to determine the resource scheduling manner according to the antenna port quantity information specified by the network device. That is, the determining module 51 determines to use different resource scheduling manners according to different antenna port quantities specified by the network device. Therefore, when the antenna port quantity changes, the bit quantity used for the resource scheduling is reduced on the basis of ensuring the performance of the resource scheduling.

Further, the foregoing resource scheduling manner includes a contiguous resource scheduling manner and a non-contiguous resource scheduling manner. The determining module 51 is specifically configured to: if it is determined that an antenna port quantity specified by the network device is greater than a preset threshold, determine to use the contiguous resource scheduling manner; otherwise, determine to use the non-contiguous resource scheduling manner. A threshold for the antenna port quantity is preset in the apparatus for sending resource scheduling information. The determining module 51 performs judgment on the antenna port quantity specified by the network device. If the antenna port quantity is greater than the preset threshold, the contiguous resource scheduling manner is used; otherwise, the non-contiguous resource scheduling manner is used.

The sending module 52 is configured to send resource scheduling information to UE according to the resource scheduling manner.

Specifically, after the determining module 51 determines the resource scheduling manner, the sending module 52 in the apparatus for sending resource scheduling information sends, to the UE according to the resource scheduling manner, resource scheduling information that is generated according to the resource scheduling manner. The resource scheduling information is sent to the UE in a manner of signaling, so that the UE receives, on a corresponding resource, a downlink resource according to the received resource scheduling information.

In this embodiment, the resource scheduling manner is determined according to the antenna port quantity information specified by the network device, and the resource scheduling information is sent to the UE. When the antenna port quantity specified by the network device is relatively large, the bit quantity used for sending the resource scheduling information is reduced, thereby saving system overheads.

Further, when receiving the resource scheduling information, the UE needs to learn the bit quantity used for sending the resource scheduling information, so that the UE can receive the resource scheduling information on a corresponding bit. Therefore, the UE also needs to know the antenna port quantity information specified by the network device. Therefore, the sending module 52 is further configured to send the antenna port quantity information specified by the network device to the UE. The threshold for the antenna port quantity is also preset in the UE. When obtaining the antenna port quantity information specified by the network device, the UE can know the bit quantity used by the resource scheduling information that needs to be received, so that the resource scheduling information can be received on a corresponding bit.

Figure 6:
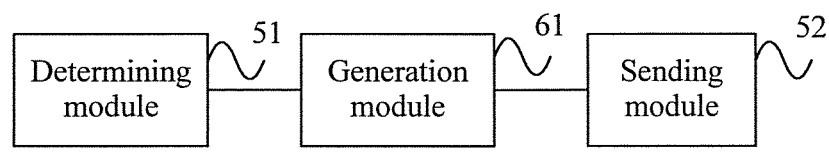
FIG. 6 is a schematic structural diagram of Embodiment 2 of an apparatus for sending resource scheduling information according to an embodiment of the present invention.

FIG. 6 is a schematic structural diagram of Embodiment 2 of an apparatus for sending resource scheduling information according to an embodiment of the present invention. As shown in FIG. 6, on the basis of FIG. 5, the apparatus for sending resource scheduling information in this embodiment further includes:

a generation module 61, configured to: if the determining module 51 determines to use the contiguous resource scheduling manner, generate extended multi-user MIMO pairing information.

Specifically, in the embodiment shown in FIG. 5, the determining module 51 determines the resource scheduling manner according to the antenna port quantity information specified by the network device. If the determining module 51 determines to use the contiguous resource scheduling manner, the bit quantity used for sending the resource scheduling information decreases. In this embodiment, further, more pieces of other information may be sent to the UE by using the bit quantity reduced from the resource scheduling information. Therefore, the apparatus for sending resource scheduling information provided in this embodiment further includes a generation module 61. When the determining module 51 determines to use the contiguous resource scheduling manner, the generation module 61 generates the extended multi-user MIMO pairing information.

In a current LTE standard, a maximum of four layers of multi-user MIMO (Multi User MIMO, MU-MIMO) are supported. In the MU-MIMO, one user transfers a maximum of two layers of data. When massive MIMO is used, the MU-MIMO becomes a primary scenario, and layers of data transmitted by one user increase. Therefore, reduced bits may be used to indicate extra multi-user MIMO pairing information, that is, the extended multi-user MIMO pairing information may be generated. The extended multi-user MIMO pairing information represents multi-user MIMO allocation information with richer information. Compared with existing multi-user MIMO pairing information, the extended multi-user MIMO pairing information includes more information. For example, in a Format 2C format, meanings of three bits, which are an antenna port, a scrambling identity, and a layer quantity, are shown in Table 6.

TABLE 6

Comparison table of indications of an antenna port, a scrambling identity, and a layer quantity

| One Codeword Codeword 0 enabled Codeword 1 disabled | | Two Codeword Codeword 0 enabled Codeword 1 enabled | |
|---|---|---|---|
| Value | Information | Value | Information |
| 0 | 1 layer, port7, $n_{SCID} = 0$ | 0 | 2 layers, port7-8, $n_{SCID} = 0$ |
| 1 | 1 layer, port7, $n_{SCID} = 1$ | 1 | 2 layers, port7-8, $n_{SCID} = 1$ |
| 2 | 1 layer, port8, $n_{SCID} = 0$ | 2 | 3 layers, port7-9 |
| 3 | 1 layer, port8, $n_{SCID} = 1$ | 3 | 4 layers, port7-10 |
| 4 | 2 layers, port7-8 | 4 | 5 layers, port7-11 |
| 5 | 3 layers, port7-9 | 5 | 6 layers, port7-12 |
| 6 | 4 layers, port7-10 | 6 | 7 layers, port7-13 |
| 7 | Reserved | 7 | 8 layers, port7-14 |

In Table 6, One Codeword represents using one codeword, Two Codeword represents using two codewords, Codeword 0 enabled represents that a codeword 0 is available, Codeword 1 disabled represents that a codeword 1 is unavailable, Codeword 1 enabled represents that the codeword 1 is available, Values 0 to 7 represent eight values that can be represented by three bits, layer is layer information and represents a layer quantity of data, port is port information and represents a used antenna port number, $n_{SCID}$ is a scrambling identity, and Reserved is reserved space.

In this embodiment, the three bits, which are the antenna port, the scrambling identity, and the layer quantity, shown in Table 6 may be extended into four bits, to generate extended indications of the antenna port, the scrambling identity, and the layer quantity, as shown in Table 7.

TABLE 7

Comparison table of extended indications of an antenna port, a scrambling identity, and a layer quantity

| | One Codeword Codeword 0 enabled Codeword 1 disabled | | Two Codeword Codeword 0 enabled Codeword 1 enabled |
|---|---|---|---|
| Value | Information | Value | Information |
| 0 | 1 layer, port7, $n_{SCID}=0$ | 0 | 2 layers, port7-8, $n_{SCID}=0$ |
| 1 | 1 layer, port7, $n_{SCID}=1$ | 1 | 2 layers, port7-8, $n_{SCID}=1$ |
| 2 | 1 layer, port8, $n_{SCID}=0$ | 2 | 3 layers, port7-9 |
| 3 | 1 layer, port8, $n_{SCID}=1$ | 3 | 4 layers, port7-10 |
| 4 | 2 layers, port7-8 | 4 | 5 layers, port7-11 |
| 5 | 3 layers, port7-9 | 5 | 6 layers, port7-12 |
| 6 | 4 layers, port7-10 | 6 | 7 layers, port7-13 |
| 7 | Reserved | 7 | 8 layers, port7-14 |
| 8 | 1 layer, port9, $n_{SCID}=0$ | 8 | 2 layers, port9-10, $n_{SCID}=0$ |
| 9 | 1 layer, port10, $n_{SCID}=0$ | 9 | 2 layers, port11, 13, $n_{SCID}=0$ |
| 10 | 1 layer, port11, $n_{SCID}=0$ | 10 | 2 layers, port12, 14, $n_{SCID}=0$ |
| 11 | 1 layer, port12, $n_{SCID}=0$ | 11 | 2 layers, port9-10, $n_{SCID}=1$ |
| 12 | 1 layer, port13, $n_{SCID}=0$ | 12 | 2 layers, port11, 13, $n_{SCID}=1$ |
| 13 | 1 layer, port14, $n_{SCID}=0$ | 13 | 2 layers, port12, 14, $n_{SCID}=1$ |
| 14 | | 14 | |
| 15 | | 15 | |

In addition, the extended multi-user MIMO pairing information not only may include the comparison table of indications of an antenna port, a scrambling identity, and a layer quantity shown in Table 7, but also may include multi-user pairing information, as shown in Table 8.

TABLE 8

Multi-user pairing information table

| | One Codeword, Codeword 0 enabled Codeword 1 disabled | | Two Codeword Codeword 0 enabled Codeword 1 enabled |
|---|---|---|---|
| Value | Information | Value | Information |
| 0 | Total 1 layer | 0 | Total 1 layer |
| 1 | Total 2 layers port7-8 | 1 | Total 2 layers port7-8 |
| 2 | Total 3 layers port7-9 | 2 | Total 3 layers port7-9 |
| 3 | Total 4 layers port7-10 | 3 | Total 4 layers port7-10 |
| 4 | Total 5 layers port7-11 | 4 | Total 5 layers port7-11 |
| 5 | Total 6 layers port7-12 | 5 | Total 6 layers port7-12 |
| 6 | Total 7 layers port7-13 | 6 | Total 7 layers port7-13 |
| 7 | Total 8 layers port7-14 | 7 | Total 8 layers port7-14 |

The multi-user pairing information is shown in Table 8 by using three bits, where the multi-user pairing information includes a pairing relationship between layer information and port information.

Table 7 and Table 8 show only two cases of the extended multi-user MIMO matching information. In this embodiment, extended multi-user MIMO matching information is not limited thereto. Information that can represent more related information of the multi-user MIMO may become the extended multi-user MIMO matching information.

The sending module 52 is further configured to send the extended multi-user MIMO pairing information to the UE. Specifically, in this embodiment, the sending module 52 is further configured to send the extended multi-user MIMO pairing information to the UE. The sending module 52 may send the extended multi-user MIMO pairing information by using bits that are reduced by sending the resource scheduling information when the determining module 51 determines to use the contiguous resource scheduling manner, so that more multi-user MIMO pairing information may be sent to the UE on the premise of not increasing system overheads.

Further, in the embodiments shown in FIG. 5 and FIG. 6, the determining module 51 may determine the resource scheduling manner according to any type of antenna port quantity information actively or passively specified by the network device. For example, the determining module 51 may determine the resource scheduling manner according to set CSI antenna port quantity information.

Figure 7:
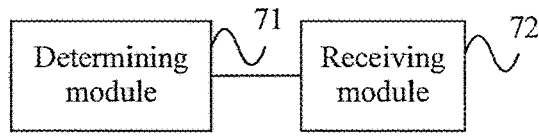
FIG. 7 is a schematic structural diagram of Embodiment 1 of an apparatus for receiving resource scheduling information according to an embodiment of the present invention.

FIG. 7 is a schematic structural diagram of Embodiment 1 of an apparatus for receiving resource scheduling information according to an embodiment of the present invention. As shown in FIG. 7, the apparatus for receiving resource scheduling information in this embodiment includes: a determining module 71 and a receiving module 72.

The determining module 71 is configured to determine a resource scheduling manner according to antenna port quantity information specified by a network device.

Specifically, the apparatus for receiving resource scheduling information provided in this embodiment is located on a UE side, or may be disposed in UE. The apparatus for receiving resource scheduling information provided in this embodiment is configured to feed back a CQI to the network device in a network, where the network device is an access device in the network, for example, a base station or an eNodeB of any type.

It can be learned according to the embodiment shown in FIG. 5 that, the apparatus for sending resource scheduling information on the network device side needs to determine the resource scheduling manner according to the antenna port quantity information specified by the network device, and send the resource scheduling information to the UE according to the resource scheduling manner. However, to obtain the resource scheduling information from a corresponding bit, the UE also needs to determine the resource scheduling manner used by the network device. Therefore, in this embodiment, the apparatus for receiving resource scheduling information includes the determining module 71, where the determining module 71 determines the resource scheduling manner according to the antenna port quantity information specified by the network device. A method in which the determining module 71 determines the resource scheduling information is the same as that of the determining module 51 in FIG. 5.

The receiving module 72 is configured to receive, according to the resource scheduling manner, resource scheduling information sent by the network device.

Specifically, after the determining module 71 determines the resource scheduling manner, the receiving module 72 may receive, according to the resource scheduling manner, the resource scheduling information sent by the network device, so that the UE receives, on a corresponding resource, data according to the resource scheduling information.

In this embodiment, the resource scheduling manner is determined according to the antenna port quantity information specified by the network device, and the resource scheduling information sent by the network device is received. When the antenna port quantity specified by the network device is relatively large, the bit quantity used for sending the resource scheduling information is reduced, thereby saving system overheads.

Figure 8:
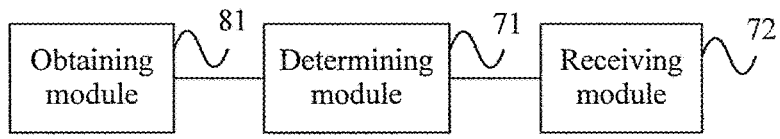
FIG. 8 is a schematic structural diagram of Embodiment 2 of an apparatus for receiving resource scheduling information according to an embodiment of the present invention.

FIG. 8 is a schematic structural diagram of Embodiment 2 of an apparatus for receiving resource scheduling information according to an embodiment of the present invention. As shown in FIG. 8, on the basis of FIG. 7, the apparatus for receiving resource scheduling information in this embodiment further includes:

an obtaining module 81, configured to obtain the antenna port quantity information that is sent by the network device and that is specified by the network device.

Specifically, because the determining module 71 needs to determine the resource scheduling manner according to the antenna port quantity information specified by the network device, the apparatus for receiving resource scheduling information first needs to obtain the antenna port quantity information specified by the network device. The obtaining module in the apparatus for receiving resource scheduling information is configured to obtain the antenna port quantity information that is sent by the network device and that is specified by the network device.

Further, in the embodiments shown in FIG. 7 and FIG. 8, the resource scheduling manner includes a contiguous resource scheduling manner and a non-contiguous resource scheduling manner. The determining module 71 is specifically configured to: if it is determined that the antenna port quantity specified by the network device is greater than the preset threshold, determine to use the contiguous resource scheduling manner; otherwise, determine to use the non-contiguous resource scheduling manner. A threshold for the antenna port quantity is preset in the apparatus for receiving resource scheduling information. The determining module 71 performs judgment on the antenna port quantity specified by the network device. If the antenna port quantity is greater than the preset threshold, the contiguous resource scheduling manner is used; otherwise, the non-contiguous resource scheduling manner is used.

A bit quantity used in the contiguous resource scheduling manner is $\lceil \log_2(N_{RB}^{DL}(N_{RB}^{DL}+1)/2) \rceil$, and a bit quantity used in the non-contiguous resource scheduling manner is $\lceil N_{RB}^{DL}/P \rceil$, where $N_{RB}^{DL}$ represents a downlink system bandwidth, and P is determined according to the downlink system bandwidth and a subband size and is an integer.

Further, in the embodiments shown in FIG. 7 and FIG. 8, if the determining module 71 determines to use the contiguous resource scheduling manner, the receiving module 72 is further configured to receive extended multi-user MIMO pairing information sent by the network device. Specifically, in the embodiments shown in FIG. 7 and FIG. 8, if the determining module 71 determines to use the contiguous resource scheduling manner, the bit quantity used by the resource scheduling information received by the receiving module 72 decreases. Therefore, the receiving module 72 may receive, by using reduced bits, the extended multi-user MIMO pairing information sent by the network device. The extended multi-user MIMO pairing information represents multi-user MIMO allocation information with richer information. Compared with existing multi-user MIMO pairing information, the extended multi-user MIMO pairing information includes more information. As shown in Table 6 to Table 8, the reduced bits may be used to receive extra information.

Further, in the embodiments shown in FIG. 7 and FIG. 8, the determining module 71 may determine the resource scheduling manner according to any type of antenna port quantity information actively or passively specified by the network device. For example, the determining module 71 may determine the resource scheduling manner according to measurement CSI and antenna port quantity information that are specified by the network device.

Figure 9:
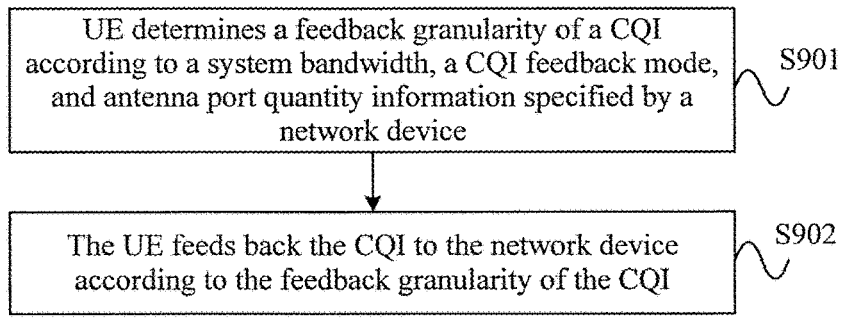
FIG. 9 is a flowchart of Embodiment 1 of a method for feeding back a channel quality indicator according to an embodiment of the present invention.

FIG. 9 is a flowchart of Embodiment 1 of a method for feeding back a channel quality indicator according to an embodiment of the present invention. As shown in FIG. 9, the method in this embodiment includes:

Step S901: UE determines a feedback granularity of a CQI according to a system bandwidth, a CQI feedback mode, and antenna port quantity information specified by a network device.

Step S902: The UE feeds back the CQI to the network device according to the feedback granularity of the CQI.

The method for feeding back a channel quality indicator in this embodiment is applied to the apparatus for feeding back a channel quality indicator shown in FIG. 1, and principles and technical effects are similar, which are not described herein.

Figure 10:
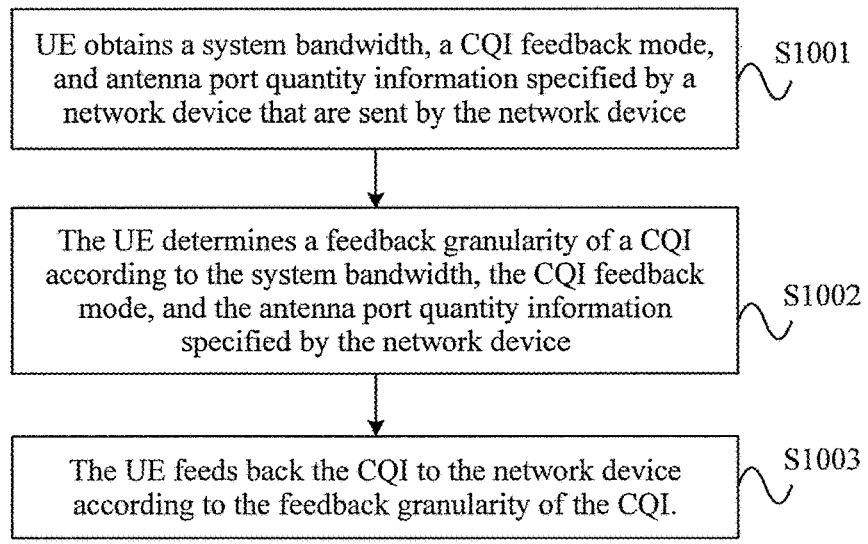
FIG. 10 is a flowchart of Embodiment 2 of a method for feeding back a channel quality indicator according to an embodiment of the present invention.

FIG. 10 is a flowchart of Embodiment 2 of a method for feeding back a channel quality indicator according to an embodiment of the present invention. As shown in FIG. 10, the method in this embodiment includes:

Step S1001: The UE obtains the system bandwidth, the CQI feedback mode, and the antenna port quantity information specified by the network device that are sent by the network device.

Step S1002: The UE determines the feedback granularity of the CQI according to the system bandwidth, the CQI feedback mode, and the antenna port quantity information specified by the network device.

Step S1003: The UE feeds back the CQI to the network device according to the feedback granularity of the CQI.

The method for feeding back a channel quality indicator in this embodiment is applied to the apparatus for feeding back a channel quality indicator shown in FIG. 2, and principles and technical effects are similar, which are not described herein.

Further, in the embodiments shown in FIG. 9 and FIG. 10, the antenna port quantity information specified by the network device includes CSI-RS antenna port quantity information specified by the network device.

Further, in the embodiments shown in FIG. 9 and FIG. 10, in a same system bandwidth and a same CQI feedback mode, if the network device includes at least two types of antenna port quantities and each type of antenna port quantity corresponds to a different feedback granularity, a larger antenna port quantity indicates a larger feedback granularity.

Further, in the embodiments shown in FIG. 9 and FIG. 10, the feedback granularity of the CQI includes a size of a frequency width corresponding to the CQI.

Figure 11:
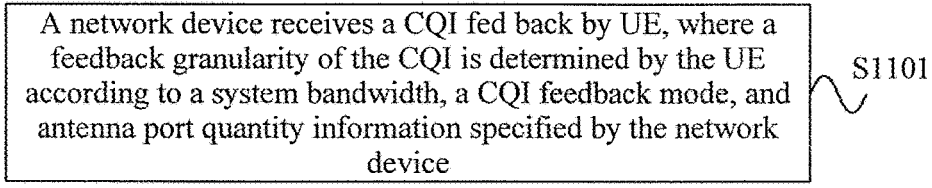
FIG. 11 is a flowchart of Embodiment 1 of a method for receiving a channel quality indicator according to an embodiment of the present invention.

FIG. 11 is a flowchart of Embodiment 1 of a method for receiving a channel quality indicator according to an embodiment of the present invention. As shown in FIG. 11, the method in this embodiment includes:

Step S1101: A network device receives a CQI fed back by UE, where a feedback granularity of the CQI is determined by the UE according to a system bandwidth, a CQI feedback mode, and antenna port quantity information specified by the network device.

The method for receiving a channel quality indicator in this embodiment is applied to the apparatus for receiving a channel quality indicator shown in FIG. 3, and principles and technical effects are similar, which are not described herein.

Figure 12:
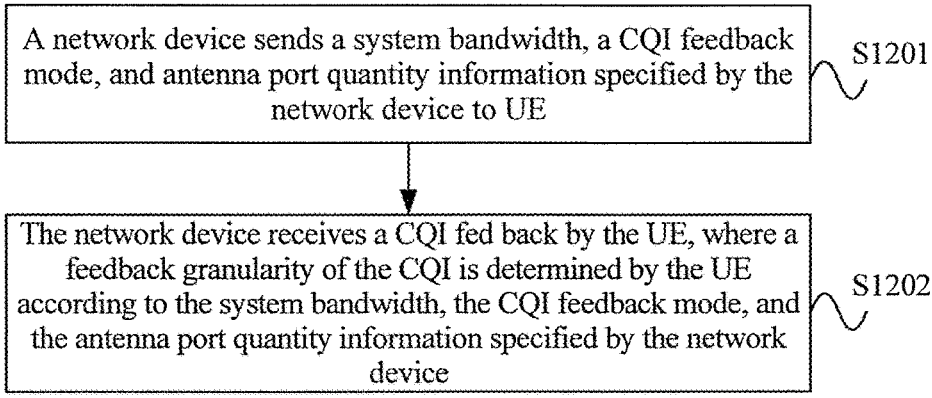
FIG. 12 is a flowchart of Embodiment 2 of a method for receiving a channel quality indicator according to an embodiment of the present invention.

FIG. 12 is a flowchart of Embodiment 2 of a method for receiving a channel quality indicator according to an embodiment of the present invention. As shown in FIG. 12, the method in this embodiment includes:

Step S1201: A network device sends a system bandwidth, a CQI feedback mode, and antenna port quantity information specified by the network device to UE.

Step S1202: The network device receives a CQI fed back by the UE, where a feedback granularity of the CQI is determined by the UE according to the system bandwidth, the CQI feedback mode, and the antenna port quantity information specified by the network device.

The method for receiving a channel quality indicator in this embodiment is applied to the apparatus for receiving a channel quality indicator shown in FIG. 4, and principles and technical effects are similar, which are not described herein.

Further, in the embodiments shown in FIG. 11 and FIG. 12, the antenna port quantity information specified by the network device includes CSI-RS antenna port quantity information specified by the network device.

Further, in the embodiments shown in FIG. 11 and FIG. 12, in a same system bandwidth and a same CQI feedback mode, if the network device includes at least two types of antenna port quantities and each type of antenna port quantity corresponds to a different feedback granularity, a larger antenna port quantity indicates a larger feedback granularity.

Further, in the embodiments shown in FIG. 11 and FIG. 12, the feedback granularity of the CQI includes a size of a frequency width corresponding to the CQI.

Figure 13:
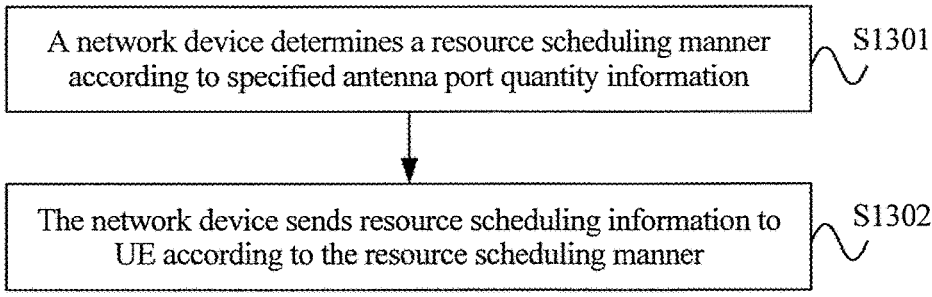
FIG. 13 is a flowchart of Embodiment 1 of a method for sending resource scheduling information according to an embodiment of the present invention.

FIG. 13 is a flowchart of Embodiment 1 of a method for sending resource scheduling information according to an embodiment of the present invention. As shown in FIG. 13, the method in this embodiment includes:

Step S1301: A network device determines a resource scheduling manner according to specified antenna port quantity information.

Step S1302: The network device sends resource scheduling information to UE according to the resource scheduling manner.

The method for sending resource scheduling information in this embodiment is applied to the apparatus for sending resource scheduling information shown in FIG. 5, and principles and technical effects are similar, which are not described herein.

Figure 14:
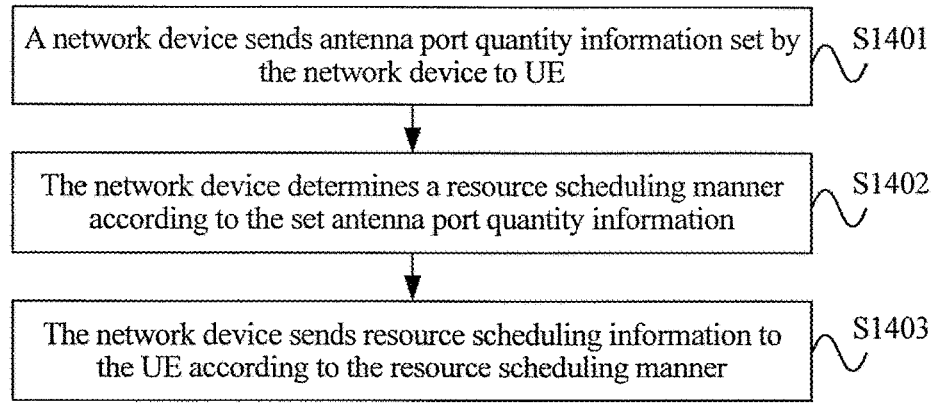
FIG. 14 is a flowchart of Embodiment 2 of a method for sending resource scheduling information according to an embodiment of the present invention.

FIG. 14 is a flowchart of Embodiment 2 of a method for sending resource scheduling information according to an embodiment of the present invention. As shown in FIG. 14, the method in this embodiment includes:

Step S1401: A network device sends antenna port quantity information specified by the network device to UE.

Step S1402: The network device determines a resource scheduling manner according to the specified antenna port quantity information.

Step S1403: The network device sends resource scheduling information to the UE according to the resource scheduling manner.

Further, in the embodiments shown in FIG. 13 and FIG. 14, the resource scheduling manner includes a contiguous resource scheduling manner and a non-contiguous resource scheduling manner. The determining, by the network device, a resource scheduling manner according to the specified antenna port quantity information includes: if the network device determines that a specified antenna port quantity is greater than a preset threshold, determining to use the contiguous resource scheduling manner; otherwise, determining, by the network device, to use the non-contiguous resource scheduling manner.

Further, in the embodiments shown in FIG. 13 and FIG. 14, a bit quantity used in the contiguous resource scheduling manner is $\lceil \log_2(N_{RB}^{DL}(N_{RB}^{DL}+1)/2) \rceil$, and a bit quantity used in the non-contiguous resource scheduling manner is $\lceil N_{RB}^{DL}/P \rceil$, where $N_{RB}^{DL}$ represents a downlink system bandwidth, and P is determined according to the downlink system bandwidth and a subband size and is an integer.

Figure 15:
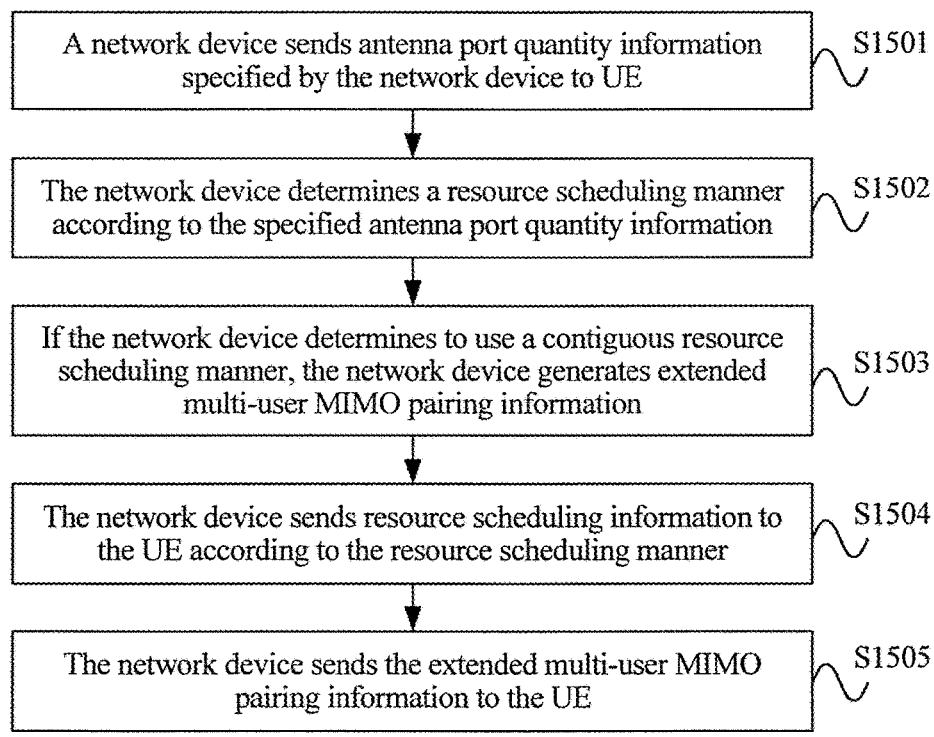
FIG. 15 is a flowchart of Embodiment 3 of a method for sending resource scheduling information according to an embodiment of the present invention.

FIG. 15 is a flowchart of Embodiment 3 of a method for sending resource scheduling information according to an embodiment of the present invention. As shown in FIG. 15, the method in this embodiment includes:

Step S1501: A network device sends antenna port quantity information specified by the network device to UE.

Step S1502: The network device determines a resource scheduling manner according to the specified antenna port quantity information.

Step S1503: If the network device determines to use a contiguous resource scheduling manner, the network device generates extended multi-user MIMO pairing information.

Step S1504: The network device sends resource scheduling information to the UE according to the resource scheduling manner.

Step S1505: The network device sends the extended multi-user MIMO pairing information to the UE.

The method for sending resource scheduling information in this embodiment is applied to the apparatus for sending resource scheduling information shown in FIG. 6, and principles and technical effects are similar, which are not described herein.

Further, in the embodiments shown in FIG. 13 to FIG. 15, the determining, by the network device, a resource scheduling manner according to the specified antenna port quantity information includes: determining, by the network device, the resource scheduling manner according to set measurement CSI antenna port quantity information.

Figure 16:
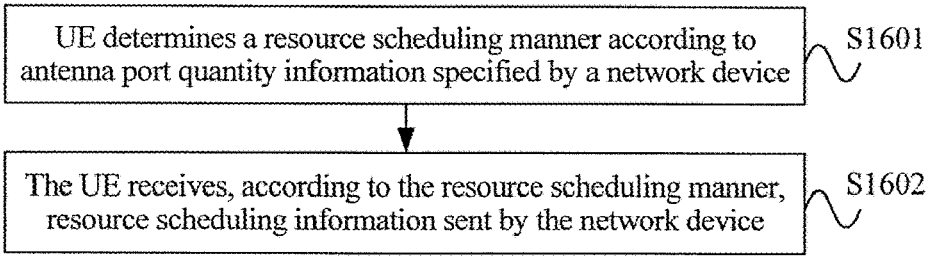
FIG. 16 is a flowchart of Embodiment 1 of a method for receiving resource scheduling information according to an embodiment of the present invention.

FIG. 16 is a flowchart of Embodiment 1 of a method for receiving resource scheduling information according to an embodiment of the present invention. As shown in FIG. 16, the method in this embodiment includes:

Step S1601: UE determines a resource scheduling manner according to antenna port quantity information specified by a network device.

Step S1602: The UE receives, according to the resource scheduling manner, resource scheduling information sent by the network device.

The method for receiving resource scheduling information in this embodiment is applied to the apparatus for receiving resource scheduling information shown in FIG. 7, and principles and technical effects are similar, which are not described herein.

Figure 17:
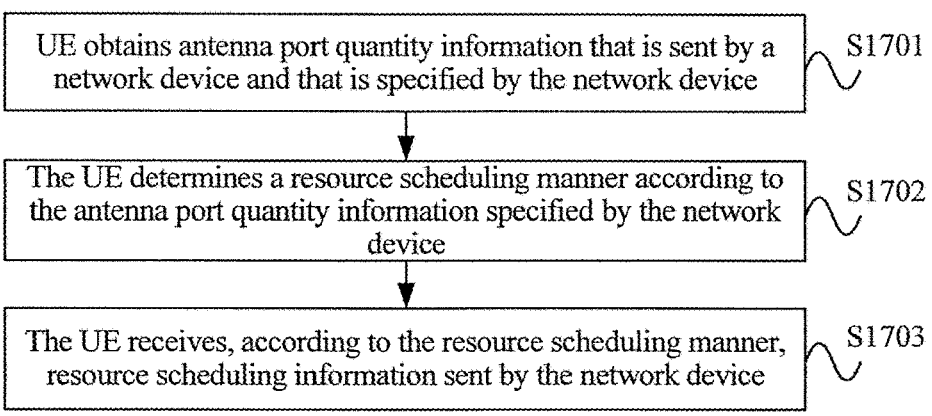
FIG. 17 is a flowchart of Embodiment 2 of a method for receiving resource scheduling information according to an embodiment of the present invention.

FIG. 17 is a flowchart of Embodiment 2 of a method for receiving resource scheduling information according to an embodiment of the present invention. As shown in FIG. 17, the method in this embodiment includes:

Step S1701: UE obtains antenna port quantity information that is sent by a network device and that is specified by the network device.

Step S1702: The UE determines a resource scheduling manner according to the antenna port quantity information specified by the network device.

Step S1703: The UE receives, according to the resource scheduling manner, resource scheduling information sent by the network device.

Further, in the embodiments shown in FIG. 16 and FIG. 17, the resource scheduling manner includes a contiguous resource scheduling manner and a non-contiguous resource scheduling manner. The determining, by the UE, a resource scheduling manner according to the antenna port quantity information specified by the network device includes: if the UE determines that an antenna port quantity specified by the network device is greater than a preset threshold, determining to use the contiguous resource scheduling manner; otherwise, determining, by the UE, to use the non-contiguous resource scheduling manner.

Further, in the embodiments shown in FIG. 16 and FIG. 17, a bit quantity used in the contiguous resource scheduling manner is $\lceil \log_2(N_{RB}^{DL}(N_{RB}^{DL}+1)/2) \rceil$, and a bit quantity used in the non-contiguous resource scheduling manner is $\lceil N_{RB}^{DL}/P \rceil$, where $N_{RB}^{DL}$ represents a downlink system bandwidth, and P is determined according to the downlink system bandwidth and a subband size and is an integer.

Figure 18:
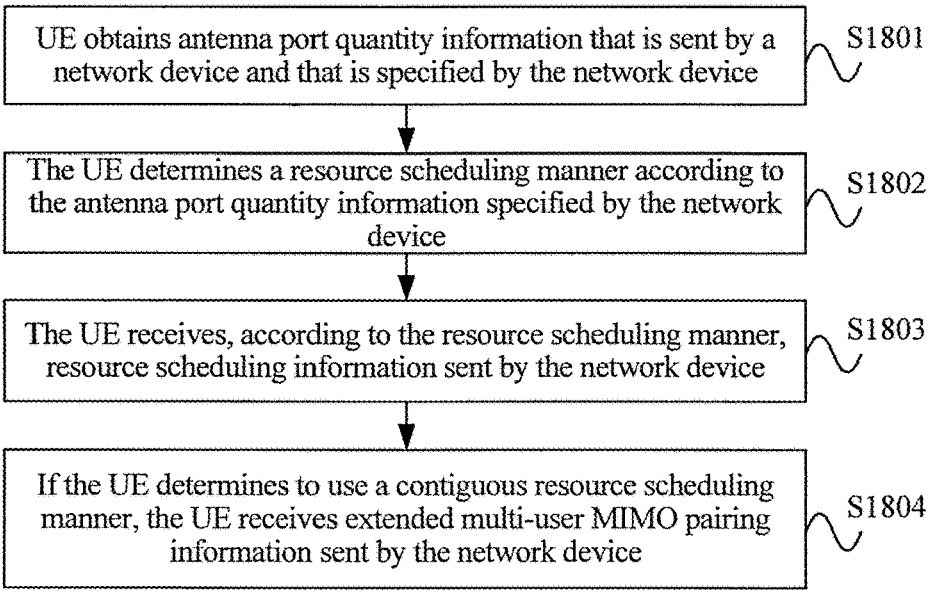
FIG. 18 is a flowchart of Embodiment 3 of a method for receiving resource scheduling information according to an embodiment of the present invention.

FIG. 18 is a flowchart of Embodiment 3 of a method for receiving resource scheduling information according to an embodiment of the present invention. As shown in FIG. 18, the method in this embodiment includes:

Step S1801: UE obtains antenna port quantity information that is sent by a network device and that is specified by the network device.

Step S1802: The UE determines a resource scheduling manner according to the antenna port quantity information specified by the network device.

Step S1803: The UE receives, according to the resource scheduling manner, resource scheduling information sent by the network device.

Step S1804: If the UE determines to use a contiguous resource scheduling manner, the UE receives extended multi-user MIMO pairing information sent by the network device.

The method for receiving resource scheduling information in this embodiment is applied to the apparatus for receiving resource scheduling information shown in FIG. 8, and principles and technical effects are similar, which are not described herein.

Further, in the embodiments shown in FIG. 16 to FIG. 18, the determining, by the UE, a resource scheduling manner according to the antenna port quantity information specified by the network device includes: determining, by the UE, the resource scheduling manner according to measurement CSI the antenna port quantity information that are specified by the network device.

Figure 19:
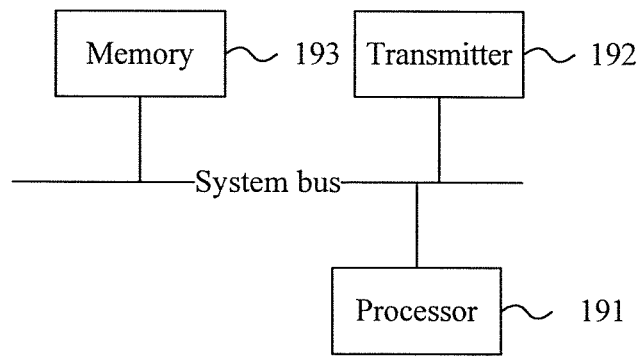
FIG. 19 is a schematic structural diagram of Embodiment 1 of UE according to an embodiment of the present invention.

FIG. 19 is a schematic structural diagram of Embodiment 1 of UE according to an embodiment of the present invention. As shown in FIG. 19, the UE in this embodiment includes a processor 191 and a transmitter 192. Optionally, the UE may further include a memory 193. The processor 191, the transmitter 192, and the memory 193 may be interconnected by using a system bus or in another manner. Interconnection by using a system bus is used as an example in FIG. 19. The system bus may be an industrial standard architecture (Industrial Standard Architecture, ISA) bus, a peripheral component interconnect (Peripheral Component Interconnect, PCI) bus, an extended industrial standard architecture (Extended Industrial Standard Architecture, EISA) bus, or the like. The system bus may be classified into an address bus, a data bus, a control bus, and the like. For ease of representation, only one line is used in FIG. 19 for representation, but it does not mean that there is only one bus or one type of bus.

The processor 191 is configured to determine a feedback granularity of a CQI according to a system bandwidth, a CQI feedback mode, and antenna port quantity information specified by a network device.

The transmitter 192 is configured to feedback the CQI to the network device according to the feedback granularity of the CQI.

The memory 193 is configured to store information processed by the processor 191 and send stored data by using the transmitter 192.

The UE in this embodiment is configured to implement the method for feeding back a channel quality indicator shown in FIG. 9, and principles and technical effects are similar, which are not described herein.

Figure 20:
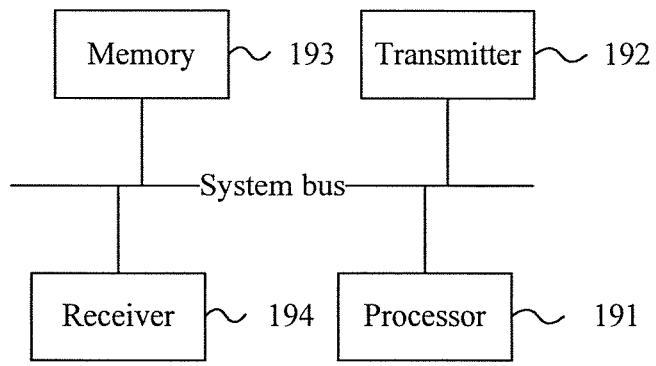
FIG. 20 is a schematic structural diagram of Embodiment 2 of UE according to an embodiment of the present invention.

FIG. 20 is a schematic structural diagram of Embodiment 2 of UE according to an embodiment of the present invention. As shown in FIG. 20, on the basis of FIG. 19, the UE in this embodiment further includes:

a receiver 194, configured to obtain the system bandwidth, the CQI feedback mode, and the antenna port quantity information specified by the network device that are sent by the network device.

Further, in the embodiments shown in FIG. 19 and FIG. 20, the antenna port quantity information specified by the network device includes CSI-RS antenna port quantity information specified by the network device.

Further, in the embodiments shown in FIG. 19 and FIG. 20, in a same system bandwidth and a same CQI feedback mode, the feedback granularity of the CQI increases with an increase of the antenna port quantity specified by the network device.

Further, in the embodiments shown in FIG. 19 and FIG. 20, the feedback granularity of the CQI includes a subband size fed back by the CQI.

Figure 21:
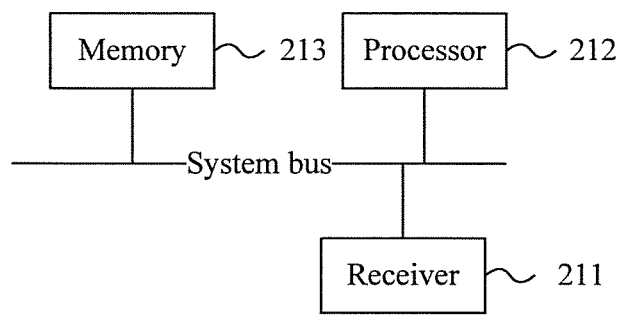
FIG. 21 is a schematic structural diagram of Embodiment 1 of a network device according to an embodiment of the present invention.

FIG. 21 is a schematic structural diagram of Embodiment 1 of a network device according to an embodiment of the present invention. As shown in FIG. 21, the network device in this embodiment includes a receiver 211. Optionally, the network device may further include a processor 212 and a memory 213. The receiver 211, the processor 212, and the memory 213 may be interconnected by using a system bus or in another manner. Interconnection by using a system bus is used as an example in FIG. 21. The system bus may be an ISA bus, a PCI bus, an EISA bus, or the like. The system bus may be classified into an address bus, a data bus, a control bus, and the like. For ease of representation, only one line is used in FIG. 21 for representation, but it does not mean that there is only one bus or one type of bus.

The receiver 211 is configured to receive a channel quality indicator CQI fed back by user equipment UE, where a feedback granularity of the CQI is determined by the UE according to a system bandwidth, a CQI feedback mode, and antenna port quantity information specified by a network device.

The processor 212 is configured to process information received by the receiver 211.

The memory 213 is configured to store the information received by the receiver 211 and store data that has been processed by the processor 212.

The network device in this embodiment is configured to implement the method for receiving a channel quality indicator shown in FIG. 11, and principles and technical effects are similar, which are not described herein.

Figure 22:
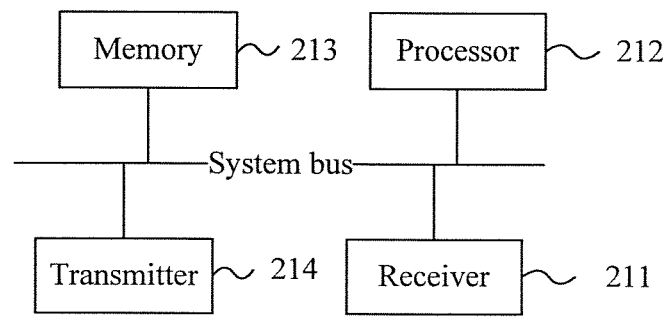
FIG. 22 is a schematic structural diagram of Embodiment 2 of a network device according to an embodiment of the present invention.

FIG. 22 is a schematic structural diagram of Embodiment 2 of a network device according to an embodiment of the present invention. As shown in FIG. 22, on the basis of FIG. 21, the network device in this embodiment further includes:

a transmitter 214, configured to send the system bandwidth, the CQI feedback mode, and the antenna port quantity information specified by the network device to the UE.

Further, in the embodiments shown in FIG. 21 and FIG. 22, the antenna port quantity information specified by the network device includes CSI-RS antenna port quantity information specified by the network device.

Further, in the embodiments shown in FIG. 21 and FIG. 22, in a same system bandwidth and a same CQI feedback mode, the feedback granularity of the CQI increases with an increase of the antenna port quantity specified by the network device.

Further, in the embodiments shown in FIG. 21 and FIG. 22, the feedback granularity of the CQI includes a subband size fed back by the CQI.

Figure 23:
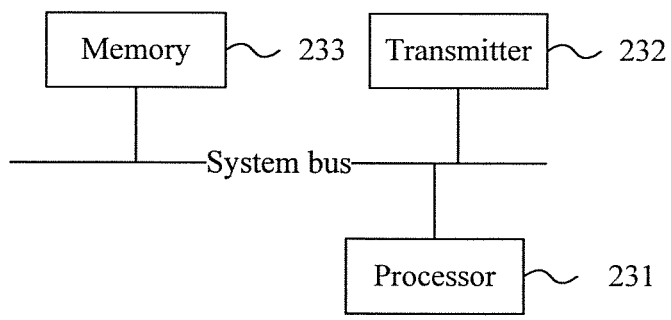
FIG. 23 is a schematic structural diagram of Embodiment 3 of a network device according to an embodiment of the present invention.

FIG. 23 is a schematic structural diagram of Embodiment 3 of a network device according to an embodiment of the present invention. As shown in FIG. 23, the network device in this embodiment includes a processor 231 and a transmitter 232. Optionally, the network device may further include a memory 233. The processor 231, the transmitter 232, and the memory 233 may be interconnected by using a system bus or in another manner. Interconnection by using a system bus is used as an example in FIG. 23. The system bus may be an ISA bus, a PCI bus, an EISA bus, or the like. The system bus may be classified into an address bus, a data bus, a control bus, and the like. For ease of representation, only one line is used in FIG. 23 for representation, but it does not mean that there is only one bus or one type of bus.

The processor 231 is configured to determine a resource scheduling manner according to antenna port quantity information specified by the network device.

The transmitter 232 is configured to send resource scheduling information to user equipment UE according to the resource scheduling manner.

The memory 233 is configured to store data that has been processed by the processor 231 and send the stored data by using the transmitter 232.

The network device in this embodiment is configured to implement the method for sending resource scheduling information shown in FIG. 13, and principles and technical effects are similar, which are not described herein.

Further, the transmitter 232 is further configured to send the antenna port quantity information specified by the network device to the UE.

Further, in the embodiment shown in FIG. 23, the resource scheduling manner includes a contiguous resource scheduling manner and a non-contiguous resource scheduling manner. The processor 231 is specifically configured to: if it is determined that an antenna port quantity specified by the network device is greater than the preset threshold, determine to use the contiguous resource scheduling manner; otherwise, determine to use the non-contiguous resource scheduling manner.

Further, in the embodiment shown in FIG. 23, a bit quantity used in the contiguous resource scheduling manner is $\lceil \log_2(N_{RB}^{DL}(N_{RB}^{DL}+1)/2) \rceil$, and a bit quantity used in the non-contiguous resource scheduling manner is $\lceil N_{RB}^{DL}/P \rceil$, where $N_{RB}^{DL}$ represents a downlink system bandwidth, and P is determined according to the downlink system bandwidth and a subband size and is an integer.

Further, in the embodiment shown in FIG. 23, the processor 231 is configured to: if it is determined to use the contiguous resource scheduling manner, generate extended multi-user multiple-input multiple-output MIMO pairing information; and the transmitter 232 is further configured to send the extended MIMO pairing information to the UE.

Further, in the embodiment shown in FIG. 23, the processor 231 is specifically configured to determine the resource scheduling manner according to set measurement CSI antenna port quantity information.

Figure 24:
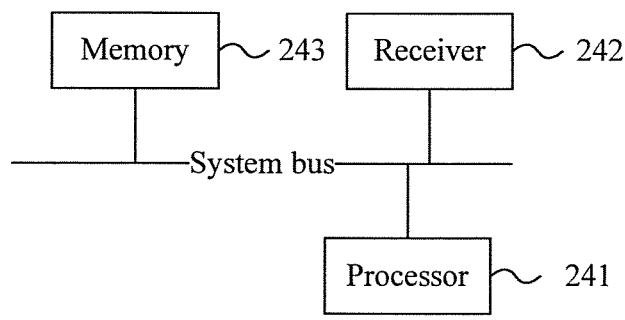
FIG. 24 is a schematic structural diagram of Embodiment 3 of UE according to an embodiment of the present invention.

FIG. 24 is a schematic structural diagram of Embodiment 3 of UE according to an embodiment of the present invention. As shown in FIG. 24, the UE in this embodiment includes a processor 241 and a receiver 242. Optionally, the UE may further include a memory 243. The processor 241, the receiver 242, and the memory 243 may be interconnected by using a system bus or in another manner. Interconnection by using a system bus is used as an example in FIG. 24. The system bus may be an ISA bus, a PCI bus, an EISA bus, or the like. The system bus may be classified into an address bus, a data bus, a control bus, and the like. For ease of representation, only one line is used in FIG. 24 for representation, but it does not mean that there is only one bus or one type of bus.

The processor 241 is configured to determine a resource scheduling manner according to antenna port quantity information specified by a network device.

The receiver 242 is configured to receive, according to the resource scheduling manner, resource scheduling information sent by the network device.

The memory 243 is configured to store data that has been processed by the processor 241 and store data received by the receiver 242.

The UE in this embodiment is configured to implement the method for receiving resource scheduling information shown in FIG. 16, and principles and technical effects are similar, which are not described herein.

Further, in the embodiment shown in FIG. 24, the receiver 242 is further configured to obtain the antenna port quantity information that is sent by the network device and that is specified by the network device.

Further, in the embodiment shown in FIG. 24, the resource scheduling manner includes a contiguous resource scheduling manner and a non-contiguous resource scheduling manner. The processor 241 is specifically configured to: if it is determined that an antenna port quantity specified by the network device is greater than the preset threshold, determine to use the contiguous resource scheduling manner; otherwise, determine to use the non-contiguous resource scheduling manner.

Further, in the embodiment shown in FIG. 24, a bit quantity used in the contiguous resource scheduling manner is $\lceil \log_2(N_{RB}^{DL}(N_{RB}^{DL}+1)/2) \rceil$, and a bit quantity used in the non-contiguous resource scheduling manner is $\lceil N_{RB}^{DL}/P \rceil$, where $N_{RB}^{DL}$ represents a downlink system bandwidth, and P is determined according to the downlink system bandwidth and a subband size and is an integer.

Further, in the embodiment shown in FIG. 24, if the processor 241 determines to use the contiguous resource scheduling manner, the receiver 242 is further configured to receive extended multi-user MIMO pairing information sent by the network device.

Further, in the embodiment shown in FIG. 24, the processor 241 is specifically configured to determine the resource scheduling manner according to measurement CSI antenna port quantity information that is specified by the network device.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof. Therefore, the protection scope of the present invention shall be subject to the protection scope of the claims.

What is claimed is:

1. A user equipment, comprising:
    a receiver, configured to obtain a system bandwidth, a channel quality indicator (CQI) feedback mode, and antenna port quantity information specified by a network device and sent by the network device,
    a processor, configured to determine a feedback granularity of a CQI according to the system bandwidth, the CQI feedback mode, and the antenna port quantity information specified by the network device; and
    a transmitter, configured to feed back the CQI to the network device according to the feedback granularity of the CQI.

2. The user equipment according to claim 1, wherein the antenna port quantity information specified by the network device comprises channel state information-reference signal (CSI-RS) antenna port quantity information specified by the network device.

3. The user equipment according to claim 1, wherein in a same system bandwidth and a same CQI feedback mode, when the network device comprises at least two types of antenna port quantities and each type of antenna port quantity corresponds to a different feedback granularity, a larger antenna port quantity indicates a larger feedback granularity.

4. The user equipment according to claim 1, wherein the feedback granularity of the CQI comprises a size of a frequency width corresponding to the CQI.

5. A network device, comprising:
    a transmitter, configured to send a system bandwidth, a channel quality indicator (CQI) feedback mode, and antenna port quantity information specified by the network device to a user equipment (UE): and
    a receiver, configured to receive a CQI fed back by the UE, wherein a feedback granularity of the CQI is determined by the UE according to the system bandwidth, the CQI feedback mode, and the antenna port quantity information specified by the network device.

6. The network device according to claim 5, wherein the antenna port quantity information specified by the network device comprises channel state information-reference signal (CSI-RS) antenna port quantity information specified by the network device.

7. The network device according to claim 5, wherein in a same system bandwidth and a same CQI feedback mode, when the network device comprises at least two types of antenna port quantities and each type of antenna port quantity corresponds to a different feedback granularity, a larger antenna port quantity indicates a larger feedback granularity.

8. The network device according to claim 5, wherein the feedback granularity of the CQI comprises a size of a frequency width corresponding to the CQI.

9. A method for feeding back a channel quality indicator, comprising:
    obtaining, by a user equipment (UE), a system bandwidth, a channel quality indicator (CQI) feedback mode, and antenna port quantity information specified by a network device and sent by the network device;
    determining, by the UE, a feedback granularity of a COI according to the system bandwidth, the CQI feedback mode, and the antenna port quantity information specified by the network device; and
    feeding back, by the UE, the CQI to the network device according to the feedback granularity of the CQI.

10. The method according to claim 9, wherein the antenna port quantity information specified by the network device comprises channel state information-reference signal (CSI-RS) antenna port quantity information specified by the network device.

11. The method according to claim 9, wherein in a same system bandwidth and a same CQI feedback mode, if the network device comprises at least two types of antenna port quantities and each type of antenna port quantity corresponds to a different feedback granularity, a larger antenna port quantity indicates a larger feedback granularity.

12. The method according to claim 9, wherein the feedback granularity of the CQI comprises a size of a frequency width corresponding to the CQI.

13. A method for receiving a channel quality indicator, comprising:
    sending, by a network device to a user equipment (UE), a system bandwidth, a channel quality indicator (CQI) feedback mode, and antenna port quantity information specified by the network device; and
    receiving, by the network device, a CQI fed back by the UE, wherein a feedback granularity of the CQI is determined by the UE according to the system bandwidth, the CQI feedback mode, and the antenna port quantity information specified by the network device.

14. The method according to claim 13, wherein the antenna port quantity information specified by the network device comprises channel state information-reference signal (CSI-RS) antenna port quantity information specified by the network device.

15. The method according to claim 13, wherein in a same system bandwidth and a same CQI feedback mode, if the network device comprises at least two types of antenna port quantities and each type of antenna port quantity corresponds to a different feedback granularity, a larger antenna port quantity indicates a larger feedback granularity.

16. The method according to claim 13, wherein the feedback granularity of the CQI comprises a size of a frequency width corresponding to the CQI.

* * * * *